Figure 1:
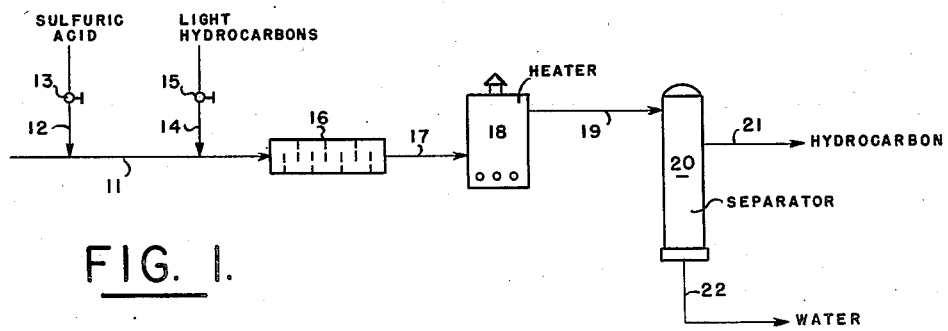

April 11, 1950   I. D. HALL   2,504,019
TREATMENT OF OIL-IN-WATER EMULSIONS
Filed Nov. 3, 1948

Ike D. Hall, INVENTOR.
BY
James B. Mueller
AGENT.

Patented Apr. 11, 1950

2,504,019

UNITED STATES PATENT OFFICE 2,504,019

TREATMENT OF OIL-IN-WATER EMULSIONS

Ike D. Hall, Baytown, Tex., assignor, by mesne assignments, to Standard Oil Development Company, Elizabeth, N. J., a corporation of Delaware Application November 3, 1948, Serial No. 58,116

8 Claims. (Cl. 252—330)

The present invention is directed to a method for recovering hydrocarbons and water from oil-in-water emulsions. More particularly, the invention is directed to the resolution of oil-in-water emulsions containing very small amounts of oil. The invention is particularly directed to those oil-in-water emulsions containing from 2000 to 10,000 parts per million of oil.

In the catalytic conversion of hydrocarbons, it is customary to heat hydrocarbons to a high temperature and to contact them at the high temperature, which may range from 800° up to about 1500° F., with a catalyst to cause the desired reaction to proceed. However, at these high temperatures in the range given, the converted hydrocarbons are in themselves quite reactive and unless their temperature is reduced rapidly, the converted hydrocarbons may undergo other conversion operations to form undesirable products. In order to eliminate reactions of this nature, it has been customary to cool converted hydrocarbons from a reaction zone of a catalytic conversion operation or a thermal conversion operation to a temperature substantially below the conversion temperature. This cooling may be accomplished by indirect means; however, it is a usual practice to reduce rapidly the temperature of converted hydrocarbons by contacting them in sequence with a so-called quench oil at a much lower temperature than the converted hydrocarbons and to follow the first quenching operation in which the converted hydrocarbons are contacted with the oil with a second quenching operation in which the converted hydrocarbons are further cooled by contacting with water. These two quenching operations successfully lower the temperatures of the converted hydrocarbon safely past the temperature at which side reactions may occur. However, there is one great disadvantage to these quenching operations in that the converted hydrocarbons are thoroughly admixed in sequence with oil and with water under conditions such that relatively stable emulsions are formed. These emulsions are of the oil-in-water type and usually contain an amount of oil in the range from 2000 to 10,000 parts per million parts of the emulsion and are extremely stable, resisting efforts to resolve the emulsion into component parts. Such an emulsion is extremely undesirable since valuable hydrocarbons are lost therein and the water is unsuitable for further use. This emulsion contains sufficient amounts of oil so that it cannot be discharged into streams since it may cause destruction of animal and fish life. The amount of oil present in the emulsion is also sufficient to prevent use of the water in the various processing operations such as in a feed to a boiler. It will thus be seen that the problem of resolving these emulsions is very serious.

It is, therefore, the main object of the present invention to provide a process in which oil-in-water emulsions are resolved into their component parts.

Another object of the present invention is to provide a process for removing oil from emulsions of oil-in-water in which the oil is present in very small amounts in the range between 2000 and 10,000 parts per million.

A still further object of the present invention is to recover valuable oil lost from catalytic and thermal conversion operations employing oil and water quenching steps.

The present invention may be described briefly as involving the adjustment of the pH of an oil-in-water emulsion to a pH no greater than 6 following which the acidified emulsion in at least an equal amount is contacted with a light hydrocarbon having from 3 to 7 carbon atoms in the molecule to form an intimate admixture therewith at a temperature in the range between 100° to 200° F. The admixture is then allowed to settle under the influence of gravity to form water and hydrocarbon phases which are separated and recovered. Thus, in accordance with the present invention, by acidifying an oil-in-water emulsion and contacting the acidified emulsion with a light hydrocarbon, it is possible to remove substantially all of the oil from an oil-in-water emulsion containing a small amount of oil in the range from about 2000 to 10,000 parts per million.

It is indeed surprising that the combination steps of acidifying and contacting with a light hydrocarbon should cause the separation of a stable emulsion of oil and water into its component parts since prior experience has shown that neither of the two steps taken separately allows the beneficial results to be obtained which the combined steps allow. Therefore, it is to be emphasized that my invention is directed to the resolution of oil-in-water emulsions involving acidifying to a pH less than 6 and contacting with a light hydrocarbon in sequence.

The type of emulsions which may be successfully treated in accordance with the present invention may include emulsions of oil-in-water such as emulsions of hydrocarbons boiling from 350° F. and upward, such as for example, kerosene hydrocarbons, gas oil hydrocarbons, lubricating oil hydrocarbons, and crude oil hydrocarbons emulsified with water. While a large number of crude oils contain hydrocarbons having boiling points below 350° F., it is to be understood that the present invention has application particularly to those emulsions of oil-in-water in which relatively heavy as opposed to relatively light hydrocarbons are involved. Thus, while crude oil is a mixture of light and heavy hydrocarbons, the heavy hydrocarbons impart the characteristics to the crude oil which cause formation of emulsions.

The light hydrocarbons which may be employed in the practice of the present invention will generally include those hydrocarbons having from 3 to 7 carbon atoms in the molecule or mixtures thereof. For example, the saturated hydrocarbons such as propane, butanes, pentanes, hexanes, heptanes, and the like or mixtures thereof may be employed as the hydrocarbon treating reagent in the practice of my invention. Similarly, the olefinic hydrocarbons such as propylene, butylenes, pentylenes, hexylenes, heptylenes, and the like may also be used or mixtures thereof. Mixtures of the foregoing olefins and paraffinic hydrocarbons also may be employed as a treating reagent in the practice of my invention. A satisfactory treating reagent may include a C₄ hydrocarbon obtained from a catalytic conversion operation such as a dehydrogenation operation or a cracking operation. Similarly, light hydrocarbon fractions from thermal treatments may also be employed. As a general rule, it may be stated that light hydrocarbons boiling below about 120° F. and usually considered below the gasoline boiling range will form the preferred treating reagents in the practice of my invention.

The acid employed in acidifying the emulsion to a pH below 6 and preferably in the range between 3.5 to 6 will usually include the mineral acids such as hydrochloric acid, nitric acid, and sulfuric acid. Other acids such as hydrofluoric, hydrobromic, and the like may also be used, but it will be preferred to employ sulfuric acid.

It will be desirable to heat the admixture of hydrocarbon and acidified emulsion to a temperature in the range between 100° and 200° F. to cause the separation to proceed at a satisfactory rate. The actual temperature employed will depend, of course, on the diluent hydrocarbon employed as a contacting agent. For example, if propane is employed, it will be desirable to use a temperature in the lower part of the range whereas if butane or the higher hydrocarbons illustrated are employed, higher temperatures in the range given may be used. For example, if a C₄ fraction is employed, it will be desirable to employ a temperature from about 150° to about 200° F. with a preferred temperature range from about 180° to 200° F.

Pressures employed in the treating operation in accordance with my invention will depend, of course, on the hydrocarbon employed as a contacting medium. As a general rule, it may be stated that a pressure sufficient to maintain a liquid phase will be necessary.

It will be desirable to contact the acidified emulsion with an amount of light hydrocarbon in the range from about 1 part of hydrocarbon to one part of emulsion to 1 part of hydrocarbon to 10 parts of emulsion. Ordinarily, however, an amount of hydrocarbon sufficient to provide a ratio of one part of hydrocarbon to three parts of emulsion will give satisfactory results.

The invention will be further illustrated by reference to the drawing in which

Figure 2:
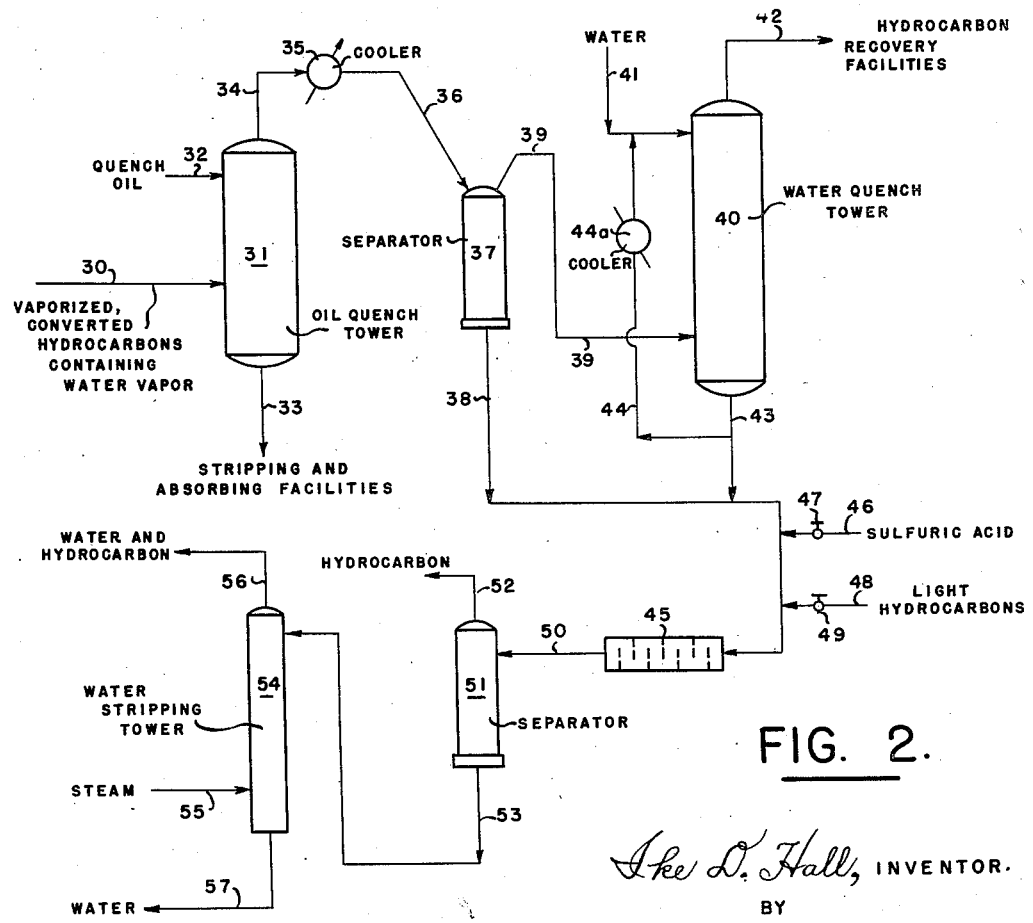

Fig. 1 is a flow diagram of one embodiment of my invention in which an emulsion of oil-in-water is resolved into its component parts; and Fig. 2 is another embodiment of my invention in which an emulsion from a conversion operation is treated for recovery of the component parts thereof.

Referring now to the drawing, and particularly to Fig. 1, numeral 11 designates a charge line through which an emulsion is introduced from a source not shown. This emulsion may be an emulsion of a hydrocarbon having a boiling point above about 350° F. and may include kerosene, gas oil, lubricating oil, or even crude oil and water. The emulsion in its passage through line 11 has admixed with it from line 12, controlled by valve 13, from a source not shown, a sufficient amount of a mineral acid, such as sulfuric acid, to acidify the emulsion to a pH no greater than 6 and in the range from about 3.5 to 6. The acidified emulsion in line 11 then has admixed with it from line 14 controlled by valve 15 an amount of a light hydrocarbon, from a source not shown, boiling below the gasoline boiling range and having from 3 to 7 carbon atoms in the molecule. The amount of hydrocarbon introduced by line 14 into line 11 may be an amount ranging from an equal amount of hydrocarbon to that of the emulsion to an amount substantially less than the emulsion. For example, the amount of emulsion to hydrocarbon may vary from a ratio of about 1 to 1 to about 10 to 1 with a preferred amount of about 3 to 1.

The admixture in line 11 to which sulfuric acid and light hydrocarbon have been added is then discharged into an incorporator 16 in which the admixture is intimately contacted and from thence it passes by line 17 into a heater 18 where its temperature is adjusted to a temperature in the range between 100° to 200° F. It may be desirable, however, under some conditions, to locate heater 18 in line 11 immediately ahead of the incorporator. The heated admixture then discharges from heater 18 by line 19 into a settling vessel or separator 20 which is of sufficient capacity to allow a separation by gravity into a hydrocarbon phase and a water phase. Usually emulsions of the type illustrated may be separated into their component parts in 15 minutes or less. Therefore, separator 20 will be of sufficient capacity to allow a residence time of about 15 minutes. The emulsion, after undergoing the treating steps in accordance with the present invention, separates into a hydrocarbon layer and a water layer in separator 20 which are removed by lines 21 and 22, respectively. The hydrocarbon phase may then be subjected to distillation for recovery of the light hydrocarbon for reuse and for recovery of the desired heavy hydrocarbons, while the water phase may be separately withdrawn and employed further in processing operations such as a feed to a steam generation plant, the oil content of the water having been reduced to a low figure of the order of less than 5 parts per million.

Referring now to Fig. 2, a vaporized, converted hydrocarbon fraction containing water vapor, such as a converted hydrocarbon from a butylenes dehydrogenation plant, is introduced into the system by line 30 and discharged thereby into an oil quench tower 31 into which is introduced by line 32 a quench oil which may be an oil boiling in the gas oil boiling range although lighter and heavier oils than gas oil hydrocarbons may be employed. The quench oil reduces the temperature of the converted hydrocarbons from about 540° F. to about 210° F., the temperature of the converted hydrocarbon having been reduced from about 1150° F. to about 540° F. prior to introduction into the quench tower 31 by passage through a waste heat boiler. The quench oil and dissolved hydrocarbons are removed from quench tower 31 by line 33 and are routed thereby to stripping and absorbing facilities not shown since they do not form an essential part of my invention. It will suffice to say that the oil withdrawn by line 33 may be subjected to a stripping operation for recovery of light hydrocarbons which may be returned to quench tower 31 and the stripped oil may then be used as an absorption oil for recovery of light hydrocarbons which are separated from the product by cooling and compression.

The vaporous products discharge from quench tower 31 by line 34 and are then further cooled by passage through cooler 35 to a temperature of about 170° F. The cooled products then discharge by line 36 into a separator 37 from whence emulsion is withdrawn by line 38, which is treated in a manner to be described, and hydrocarbon by line 39 which discharges the hydrocarbon stream into a water quench tower 40. Introduced into water quench tower 40 by line 41 is a stream of water which causes the further cooling of the hydrocarbons introduced into tower 40 by line 39. The hydrocarbons discharge from the top of quench tower 40 by line 42 and are then routed to hydrocarbon recovery facilities, not shown, which may include compression, absorption, and stabilization facilities, the oil withdrawn from tower 31 by line 33, after suitable stripping, being employed as an absorption oil for the non-condensible hydrocarbons withdrawn from tower 40 by line 42.

Water containing emulsified hydrocarbons in the amount in the range between 2000 to 10,000 parts per million is withdrawn from the bottom of tower 40 by line 43 and is separated into two portions, one portion being routed to the top of the tower by line 44 containing cooler 44a which connects into line 41 and the second portion being discharged by line 43 in admixture with the emulsion from line 38 into incorporator 45. After admixture with sulfuric acid, which is introduced by line 46 controlled by valve 47, from a source not shown, in an amount sufficient to adjust the acidity to a pH no greater than 6 and after admixture with a light hydrocarbon of the type illustrated through line 48 controlled by valve 49, from a source not shown, in an amount sufficient to provide from 1 to 10 parts of acidified emulsion for every part of light hydrocarbon, the mixture of oil, water, and light hydrocarbon is then discharged into incorporator 45.

The temperature of the stream passing through line 43 is in the range from about 150° to 200° F. and this acidified stream containing hydrocarbons which are added as described passes through incorporator 45 and is intimately admixed therewith. After the admixture of hydrocarbons and emulsion passes through incorporator 45, it discharges by line 50 into a separator 51 which is of sufficient capacity to provide a sufficient residence time for separation of the emulsion into a hydrocarbon phase which is withdrawn by line 52 and a water phase which is withdrawn by line 53.

The hydrocarbon discharged by line 52 may be further treated to separate light hydrocarbons therefrom and to recover same for further use as may be desired or for recycling to the process and for the recovery of the hydrocarbon component of the emulsion. The water phase discharges by line 53 into a water stripping tower 54 to which is introduced by line 55 a sufficient amount of steam to cause stripping from the water phase in tower 54 of light hydrocarbons which may have dissolved in the water. These light hydrocarbons and water vapor may be withdrawn from the stripping tower 54 by line 56. Substantially oil-free water suitable for boiler feed water or other uses may be recovered from tower 54 by line 57. This stream may contain less than 5 parts per million of oil whereas the stream passing through line 43 may contain from 2000 to 10,000 parts per million of oil.

The invention will be further illustrated by the following examples.

A water condensate from a butylenes dehydrogenation unit containing 3000 parts per million of emulsified oil was acidified to a pH of 6 with sulfuric acid. Three parts of this condensate were then admixed with one part of a $C_4$ hydrocarbon fraction and heated to a temperature of 150° F. under conditions of violent agitation. The admixture was then allowed to settle for 5 minutes and the hydrocarbons separated from the water. The water was analyzed and found to contain only a negligible quantity of oil.

As a still further example, a water condensate from a butylenes dehydrogenation unit containing 3000 parts per million of emulsified oil and having a pH in the range from 8 to 9 was separated into 4 portions. The first portion was acidified by addition of sulfuric acid thereto to a pH in the range between 3.5 to 4.5 and allowed to settle under the influence of gravity for 4 hours. The water phase was analyzed for oil content and found to contain 20 to 30 parts per million.

The second portion was acidified to a pH of 5 and allowed to settle for 15 minutes under the influence of gravity. The separated water phase was analyzed and found to contain between 1500 and 2000 parts per million of oil.

The third portion having a pH in the range from 8 to 9 was washed with a $C_4$ hydrocarbon fraction and allowed to settle for 15 minutes without adjustment of the pH. The water phase was found to contain between 2000 and 2500 parts per million of oil.

The forth portion had added to it a sufficient amount of sulfuric acid to adjust the acidity to a pH of 5 and was then washed with the same $C_4$ hydrocarbon fraction to which the third portion was subjected. This fourth portion was allowed to settle for 15 minutes. The water phase was then tested and found to contain less than 5 parts per million of oil.

These data show that pH adjustment followed by 15 minute settling time without the hydrocarbon wash step reduces the oil content from 3000 parts per million to between 1500 and 2000 parts per million. Washing three parts of the emulsion with 1 part of the hydrocarbon without adjustment of pH reduced the oil content to between 2000 and 2500 parts per million after 15 minutes settling time, whereas the combined steps of pH adjustment and hydrocarbon wash for the same settling time of 15 minutes reduced the oil content to less than 5 parts per million, a wholly unexpected result. These data show conclusively the superiority of the combined process over the individual steps of the prior art.

The present invention has particular application to butylenes dehydrogenation processes wherein butadiene is manufactured by dehydrogenation of normal butylenes over a fixed catalyst bed in the presence of large quantities of steam. The reaction is carried out at a temperature in the range between 1100° to 1200° F. and, consequently, the reactant mixture must be quenched to a lower temperature as rapidly as possible. This is accomplished by passing the reactor effluent through waste heat boilers which reduces the temperature of the effluent to about 540° F. Up to this point, little or no condensation of the steam takes place, and under the conditions existing in the oil quench tower, there is a certain amount of quench oil carried out of this tower either by entrainment or vaporization with the hot gases. When the gaseous mixture from the oil quench tower is subsequently cooled indirectly with cooling water, a large portion of the process steam is condensed along with the entrained quench oil to form an extremely stable emulsion of oil and water. The oil content amounts to approximately 3000 to 9000 parts per million, but may be slightly less or slightly greater. Prior to my invention, light hydrocarbons were removed and the residual water, still containing appreciable quantities of oil, was discharged from the unit, the water being of little further use. In accordance with my invention, sulfuric acid is added to the emulsion before the latter is stripped of light hydrocarbons in an amount sufficient to adjust the pH to 6 or less and the acidified mixture is admixed with a light fraction, such as a $C_4$ hydrocarbon fraction recovered in the process. The admixture to which light hydrocarbons have been added is then allowed to separate to a hydrocarbon phase and a water phase which are separately withdrawn from each other, leaving the acidified water phase substantially free of oil. This acidified water phase may be subjected to a water stripping operation with exhaust steam for removal of dissolved light hydrocarbons after which it is suitable as boiler feed water to a steam generating plant or for circulation in cooling water systems. The hydrocarbon phase may be returned to the normal processing steps for recovery of the light hydrocarbons and the hydrocarbons removed from the emulsion. My invention results in economies by recovery of valuable oil and water and by eliminating a nuisance which might result from discharge of water containing an appreciable amount of oil into streams and other natural bodies of water.

The nature and objects of the present invention having been completely described and illustrated, what I wish to claim as new and useful and to secure by Letters Patent is:

1. A method for breaking an emulsion of oil in water which comprises adjusting the pH of said emulsion to a pH no greater than 6.0, admixing said acidified emulsion in at least equal amounts with a hydrocarbon having from 3 to 7 carbon atoms in the molecule sufficient to cause phase separation, settling the admixture to form a hydrocarbon phase and a water phase, and recovering said phases.

2. A method in accordance with claim 1 in which the pH of the emulsion is adjusted by adding a mineral acid thereto.

3. A method for breaking an emulsion of oil in water which comprises admixing said emulsion at a temperature in the range between 100° and 200° F. with a sufficient amount of a mineral acid to acidify said emulsion to a pH no greater than 6.0, admixing said acidified emulsion in at least equal amounts with a light hydrocarbon having from 3 to 7 carbon atoms in the molecule sufficient to cause phase separation, settling the admixture to form a hydrocarbon phase and a water phase, and recovering said phases.

4. A method in accordance with claim 3 in which the mineral acid is sulfuric acid.

5. A method for breaking an aqueous emulsion containing an amount of oil in the range between 2000 and 10,000 parts per million of the emulsion which comprises adjusting the pH of said emulsion to a pH no greater than 6.0, admixing said acidified emulsion with a light hydrocarbon having from 3 to 7 carbon atoms in the molecule in an amount in the ratio between 1:1 and 1:10, settling the admixture under the influence of gravity to form a hydrocarbon phase and a water phase, and recovering said phases.

6. A method for breaking an emulsion containing an amount of oil in the range from 2000 to 10,000 parts per million based on the emulsion, admixing said emulsion at a temperature in the range between 100° and 200° F. with a sufficient amount of a mineral acid to acidify said emulsion to a pH in the range between 3.5 and 6, admixing said acidified emulsion with an amount of a light hydrocarbon having from 3 to 7 carbon atoms in the molecule to provide an admixture containing approximately 3 parts of emulsion and 1 part of hydrocarbon, settling the admixture under the influence of gravity to form a hydrocarbon phase and a water phase, and recovering said phases.

7. A method for separating oil from a mixture of converted hydrocarbons and water consisting predominantly of water and oil in the range between 2000 and 10,000 parts per million which comprises adding sulfuric acid to said admixture in an amount sufficient to adjust the pH of the admixture to approximately 5, admixing the acidified admixture with a sufficient amount of a light hydrocarbon boiling below the gasoline boiling range to provide a second admixture containing approximately 1 part of hydrocarbon and 3 parts of acidified admixture, maintaining the temperature of the second admixture at a temperature in the range between 100° to 200° F., settling the second admixture to form a hydrocarbon phase and a water phase, and separately recovering said phases.

8. A method for separating oil from a mixtuure of converted hydrocarbons and water containing an amount of oil in the range between 2000 and 10,000 parts per million, said oil boiling in the gas oil boiling range, which comprises adding a sufficient amount of sulfuric acid to said admixture to acidify said admixture to a pH of approximately 5, admixing said acidified admixture with a hydrocarbon fraction having 4 carbon atoms in the molecule in an amount of one part of hydrocarbon fraction to 3 parts of acidified admixture to form a second admixture, maintaining the temperature of the second admixture at a temperature in the range between 150° to 200° F., settling the admixture to form a hydrocarbon phase and a water phase, and separately recovering said phases.

IKE D. HALL.

REFERENCES CITED

The following references are of record in the file of this patent:

UNITED STATES PATENTS

| Number | Name | Date |
| --- | --- | --- |
| 1,247,782 | Ayres | Nov. 27, 1917 |
| 2,235,639 | Koch | Mar. 18, 1941 |
| 2,326,882 | Perdew | Aug. 17, 1943 |
| 2,366,792 | Kirkbride | Jan. 9, 1945 |
| 2,383,363 | Batchelder | Aug. 21, 1945 |
| 2,431,526 | Viles | Nov. 25, 1947 |
| 2,446,040 | Blair | July 27, 1948 |